(12) United States Patent
Kelly et al.

(10) Patent No.: US 7,671,149 B2
(45) Date of Patent: Mar. 2, 2010

(54) HYDROGEN RESPONSE THROUGH CATALYST MODIFICATION

(75) Inventors: Mark Kelly, Airdrie (CA); Brian Stephen Kimberley, Lyndhurst (GB)

(73) Assignees: Nova Chemical Corporation, Calgary (CA); INEOS Europe Limited, Lyndhurst (GB)

( * ) Notice: Subject to any disclaimer, the term of this patent is extended or adjusted under 35 U.S.C. 154(b) by 22 days.

(21) Appl. No.: 12/157,353

(22) Filed: Jun. 10, 2008

(65) Prior Publication Data

US 2008/0312391 A1 Dec. 18, 2008

(30) Foreign Application Priority Data

Jun. 15, 2007 (EP) .................................. 07252450

(51) Int. Cl.
C08F 4/42 (2006.01)
(52) U.S. Cl. ................. 526/124.3; 526/124.2; 526/129; 526/352; 526/348.4; 526/348; 526/913; 502/103; 502/118; 502/125
(58) Field of Classification Search .............. 526/124.2, 526/124.3, 129, 352, 348.4, 348, 913; 502/103, 502/118, 125
See application file for complete search history.

(56) References Cited

U.S. PATENT DOCUMENTS

| | | | |
|---|---|---|---|
| 3,779,712 A | 12/1973 | Calvert et al. | |
| 4,302,566 A | 11/1981 | Karol et al. | |
| 4,324,691 A | 4/1982 | Hartshorn et al. | |
| 4,496,660 A | 1/1985 | Gessell et al. | |
| 4,543,399 A | 9/1985 | Jenkins, III et al. | |
| 4,588,790 A | 5/1986 | Jenkins, III et al. | |
| 4,719,193 A | 1/1988 | Levine et al. | |
| 5,352,749 A | 10/1994 | DeChellis et al. | |
| 5,436,304 A | 7/1995 | Griffin et al. | |
| 5,633,419 A * | 5/1997 | Spencer et al. | 585/522 |
| 6,046,126 A | 4/2000 | Kelly et al. | |
| 6,140,264 A | 10/2000 | Kelly et al. | |
| 6,174,971 B1 | 1/2001 | Chen et al. | |
| 6,187,866 B1 | 2/2001 | Jorgensen et al. | |
| 6,825,293 B1 * | 11/2004 | Goyal et al. | 526/124.1 |
| 7,211,535 B2 | 5/2007 | Kelly et al. | |
| 2004/0210016 A1 | 10/2004 | Wittkowski et al. | |
| 2005/0288460 A1 | 12/2005 | Zhu et al. | |

FOREIGN PATENT DOCUMENTS

| | | |
|---|---|---|
| EP | 0453088 B1 | 7/1996 |
| EP | 0595574 B1 | 1/1997 |
| EP | 0744416 B1 | 8/1998 |

OTHER PUBLICATIONS

Mori et al , XPS study of the interaction of titanium species with internal electron donors . . . , Journal of Molecular Catalysis A: Chemical 140 (1999) 165-172.
Gao et al, Novel MgCl2—supported catalyst containing diol dibenzene donor for propylene polymerization, Polymer 45 (2004) 2175-2180.
Spitz et al, Control of the Catalyst and Polymer Properties of Linear Polyethylenes, Studies in Surface Science and Catalysis, 59 (1990) 117-130.
Chadwick et al, Aspects of hydrogen activation in proppene polymerization . . . , Macromol Chem. Phys., 197, 2501-2510 (1996).
Garoff et al, Decrease in activity caused by hydrogen in Ziegler-Natta ethene polymerisation, European Polymer Journal 38 (2002) 121-132.
Huang et al, Effects of hydrogen and 1-butene concentrations on the molecular properties of polyethylene . . . , Ind. Eng. Chem. Res. 36 (1997) 1136-1143.
Seville et al, Modelling of sintering in high temperature gas fluidisation, Powder Technology 97(1998) 160-169.
M. P. McDaniel, The state of Cr(IV)/silica polymerization catalyst, Journal of Catalysis 67 (1981) 71-76.
Xie et al, Gas phase polymerization: production processes, polymer properties, and reactor modeling, Ind. Eng. Chem. Res. 33 (1994) 449-479.
A. Noshay et al, Chemical activation of silica supports for chromocene-based polyethylene catalysts . . . , Cambridge University Press, NY, 1988, 397-416.

* cited by examiner

*Primary Examiner*—Ling-Siu Choi
(74) *Attorney, Agent, or Firm*—Kenneth H Johnson (57) ABSTRACT

The present invention provides a process for preparing a catalyst useful in gas phase polymerization of olefins wherein the hydrogen response of the catalyst can be improved by using a ketone as the electron donor in the catalyst. The catalyst consists of compounds of Ti, Mg, Al and a ketone preferably supported on an amorphous support.

16 Claims, 1 Drawing Sheet

Figure 1

HYDROGEN RESPONSE THROUGH CATALYST MODIFICATION

FIELD OF THE INVENTION

The present invention relates to preferably supported Ziegler-Natta catalysts, which are useful in olefin polymerization, and more particularly in the continuous fluidized gas phase process polymerization of alpha-olefins. The present invention provides a method for improving the hydrogen response of the catalyst as well as identifies a method to use them in a gas phase process to produce HDPE, medium and linear low-density polyethylene.

BACKGROUND OF THE INVENTION

Ziegler-Natta type catalysts are well known and have been used since the early 1950's. Generally, the catalyst comprises a transition metal compound, typically titanium in the 3 or 4 valence state (e.g. $TiCl_3$ or $TiCl_4$) supported on magnesium chloride.

In some cases, the catalysts are prepared in conjunction with an electron donor (ED), which may be used to dissolve the $MgCl_2$ and $TiCl_3$ when they are used. This type of formulation teaches away from the current disclosure. When supported on silica, and placed in a gas phase reactor with at least one co-catalyst, typically an aluminum compound such as a trialkyl aluminum (e.g. triethylaluminum (TEAL)) or an alkyl aluminum halide (e.g. diethylaluminum chloride (DEAC)) this combination makes a good catalyst for the polymerization of ethylene. When the ED is used as the solvent in the formulation it tends to narrow the molecular weight distribution (MWD—weight average molecular weight/number average molecular weight (Mw/Mn)) of the resulting polymer. As the ED is difficult to remove, polymers having a broader MWD are not easy to manufacture using this catalyst synthesis procedure. Also, as the ED must be capable of dissolving the $MgCl_2$, and in some cases $TiCl_3$, the choice of the electron donor is limited, a problem which is solved with the current disclosure. A good description of these types of catalysts is contained in U.S. Pat. No. 4,302,566 issued Nov. 24, 1981 to Karol et al., assigned to Union Carbide Corporation.

Alternately, the catalysts may contain magnesium chloride, which may be generated from a dialkyl magnesium compound, and compounds containing an active chloride. These types of catalysts are described in U.S. Pat. No. 4,324,691 issued Apr. 13, 1982 to Hartshorn et al. assigned to Imperial Chemical Industries. This is a broad patent covering the synthesis of these types of catalysts but not disclosing the process of the present invention.

In a similar vein, U.S. Pat. No. 5,633,419 issued May 27, 1997 to Spencer et al. assigned to The Dow Chemical Company discloses a supported Ziegler-Natta type catalyst or catalyst precursor. However, it is a limitation of the reference that the halide used is hydrogen halide (e.g. HCl). The reference teaches away from the subject matter of the present invention, which preferably uses alkyl halides as the halide source. Additionally, the reference teaches the use of an agglomerated support such as silica, instead of a typical granular support, which is contrary to the method for preparing the catalyst of the present invention.

European Patent Application 0 744 416 published Nov. 27, 1996 in the name of BP Chemicals Limited (BP) teaches supported catalysts and catalyst precursors. The reference teaches that the support is reacted with either an aluminum compound or a magnesium compound followed by an alkyl halide and a tetravalent titanium compound. Electron donors can be added to the support at anytime during the synthesis. The reference fails to teach that ketones could be used as electron donors. This reference also teaches that the Al:Mg molar ratio is between 0.05 to 0.35, which is outside the scope of the present catalyst formulations. This reference also teaches that the halogenating agent must be used in a molar ratio such that all of the Mg and Al compounds are converted to their respective halides, a limitation which is divergent from the present invention. That is, in accordance with the present invention, there is an excess of reactive aluminum and/or magnesium groups over reactive halide so that not all of the alkyl aluminum or magnesium are reacted to their respective halides (chlorides).

BP patent EP 0 595 574 B1 granted in Jan. 2, 1997 requires that the catalyst be prepared on a support treated with an organosilicon compound. The supports used in accordance with the present invention are treated thermally and chemically (aluminum alkyls) but not with organosilicon.

BP patent EP 0 453 088 B1 granted in Jul. 31, 1996 teaches that the catalyst be made on dehydrated silica and that the catalyst needs to be pre-polymerized to obtain a useful catalyst for the synthesis of linear low density polyethylene (LLDPE). The catalysts of the present invention do not need to be pre-polymerized to be useful for the polymerization of ethylene to manufacture polyethylene. This reference also teaches against the addition of a second aluminum compound. While the patent teaches about low levels of electron donors (e.g. ED:Ti<0.2) it fails to teach that ketones are useful as electron donors.

NOVA Chemicals Ltd. U.S. Pat. No. 6,140,264 issued Oct. 31, 2000 and U.S. Pat. No. 6,046,126 issued Apr. 4, 2000 to Kelly et al. both deal with making a $TiCl_4$ supported catalyst on magnesium chloride (precipitated from a dialkyl magnesium compound and an organic halide) which is on a thermally and chemically treated silica. This reference teaches against the addition of a second aluminum compound and limits the electron donor to relatively low levels both restrictions, which have been removed from the present invention.

The use of ketones in Ziegler-Natta catalysts has been documented in the patent literature. For example U.S. Pat. No. 4,324,691 to Hartshorn assigned to Imperial Chemical Industries, issued on Apr. 13, 1982, U.S. Pat. No. 6,187,866 to Jorgensen assigned to Union Carbide Chemicals and Plastics, issued Feb. 13, 2001, U.S. Pat. No. 6,174,971 assigned to Fina, issued Jan. 16, 2001 and 2005/0288460 assigned to Engelhard Corporation published Dec. 29, 2005 all discuss the use of ketones, among other compounds as electron donors useful in the synthesis of Ziegler-Natta catalysts. However, none of these patents identify the subject matter of this disclosure.

In U.S. Pat. No. 4,496,660 issued to Dow Chemical Company on Jan. 29, 1985, the electron donor (ED) is added directly to the alkyl magnesium compound, to pacify it prior to adding the transition metal compound, which is not a requirement of the current invention. In this patent a second transition metal containing an O or N compound when used in conjunction with another transition metal compound was found to alter the molecular weight of the polymer, a restriction that is not required in the current patent (column 11, L 55). Data on seven different electron donors including acetone are presented in Table 1 to illustrate their invention. However, due to the number of variables changed in the experimentation process (i.e. ED:Ti, Mg:Ti and Mg:Al) this patent does not teach or suggest the present invention.

In another application, that is the high pressure, high temperature, free radical process used to manufacture low density polyethylene as described in US 2004/0210016 issued to BASF on Oct. 21, 2004, ketones have been identified as being useful molecular weight regulators a function which is not performed in the present invention.

The use of electron donors has also been discussed in the open literature as well. For instance Mori et al. in Journal of Molecular Catalysis A: Chemical, 140, 1997, 165-172, showed that adding either ethyl benzoate or dibutylphthalate to a catalyst by supporting titanium on $MgCl_2$ resulted in increasing the Mn of polypropylene made with these catalysts. This teaching is against the subject matter of the present specification, which teaches reducing the Mn of the polymer when using a ketone. Gao in Polymer 45, 2004, 2175-2180 indicated that hydrogen response in polypropylene varied with the type of internal donor but again did not discuss the subject matter disclosed herein. Spitz, in Studies in Surface Science and Catalysis 1990, 59, 117-130 showed that for ethylene polymerization, the type of electron donor had a large effect on the melt index. The data presented in this paper showed that when using triethyl aluminum as the co-catalyst, the highest melt index polymers were obtained using diphenylether while the lowest melt index polymers were obtained using diphenyl dimethoxy silane. The findings presented in this paper do not disclose or suggest the subject matter of the present specification. Recent work by Chadwick et al. in Macromol. Chem. Phys. 197, 1996, 2501-2510 showed that in the synthesis of isotactic polypropylene catalysts made with diether type internal electron donors showed improved hydrogen response when compared to catalysts made with ester containing systems. Again, this teaches away from the present invention.

The present invention seeks to provide a process for the polymerization of olefin monomers preferably ethylene in which the hydrogen response of the catalyst is significantly changed compared to a generally known Ziegler Natta catalysts. Prior to the discovery of the present patent application, increasing the $H_2$ in the reactor generally reduced the molecular weight of a polymer. To a limited extent increasing the polymerization temperature or increasing the level of co-catalyst in the reactor could also affect the molecular weight of the resulting polymer. All of these methods have some drawbacks.

For instance, increasing the $H_2$ in the reactor tends to reduce catalyst productivity via two processes. First, for catalysts useful for ethylene polymerization, hydrogen is known to deactivate the catalyst as was reported by Garoff et al. in European Polymer Journal 38, 2002, 121 to 132 and Huang, et al. in Ind. Eng. Chem. Res. 1997, 36, 1136 and second increasing the level of $H_2$ in the reactor reduces the partial pressure of ethylene which also reduces the catalysts productivity. Hence, when a high MI grade (5 to 125) such as is used in injecting molding grades is required to be manufactured the catalyst productivity can be substantially reduced resulting in higher costs to the producer.

Problems associated with increasing the temperature revolve around reducing the operating window in which a commercial reactor can safely operate as discussed by Seville in Powder Technology, 97(2), 1998, 160-169. At the commercial scale, a sudden loss of fluidization can cause the granular resin in the reactor to agglomerate resulting in unwanted downtime required to clean the reactor.

Increasing the co-catalyst is also known to reduce the molecular weight of the resin however it has also been shown to reduce the resin's physical properties as reported by NOVA Chemicals in U.S. Pat. No. 6,825,293 issued on Nov. 30, 2004.

The inventors have unexpectedly found that simply by using a ketone as the electron donor in a Ziegler-Natta catalyst, polyethylene having lower molecular weight can be easily produced.

SUMMARY OF THE INVENTION

The present invention provides a process for preparing an alpha-olefin polymerization catalyst comprising of aluminum, magnesium, and titanium compounds, a ketone and optionally an inorganic oxide support capable of manufacturing a polyethylene copolymer having an MI greater than that prepared in the absence of said ketone.

Preferably the catalyst has a productivity of greater than 2000 g of a polymer per gram of catalyst under standard gas phase operations used to manufacture a 1 MI, ethylene hexene copolymer resin having a density of 0.918 g/cc comprising contacting at a temperature from 0° C. to 100° C. a support which has been heat treated to remove adsorbed water and having a residual surface hydroxyl content from 0.1 to 5 mmol/g of support, which support has been subsequently treated with an aluminum compound ($Al^1$) reactive with the residual surface hydroxyl groups to provide from 0.5 to 2.5 wt % Al on the support, in an inert hydrocarbyl solvent or diluent with or without isolation of the treated support from the hydrocarbyl solvent or diluent with: a transition metal compound, a magnesium halide, prepared by reacting in situ an alkyl magnesium compound of the formula $(R^5)_e MgX_{2-e}$ wherein each $R^5$ is independently a $C_{1-8}$ alkyl radical and e is 1 or 2 and X is a chlorine or bromine atom; with a reactive organic halide selected from the group consisting of $CCl_4$ and $C_{1-6}$ alkyl halides and mixtures thereof, a second aluminum alkyl compound ($Al^2$) and a ketone selected from the group consisting of $C_{3-18}$ linear or cyclic, aliphatic or aromatic ketones to provide a molar ratio of ketone:Mg from 0.5:1 to 5:1 and separating the resulting catalyst from the inert hydrocarbyl solvent or diluent.

The catalyst can be synthesized in any number of ways as defined in U.S. patent application Ser. No. 10/977,949 filed Oct. 29, 2004.

The present invention also provides a gas phase process for the polymerization, at a pressure from 10 to 500 psi, of a mixture comprising from 0 to 60 mole % hydrogen, from 0 to 35 mole % of one or more $C_{3-8}$ alpha-olefins, from 15 to 100 mole % of ethylene and from 0 to 75 mole % of an inert gas such as $N_2$, conducted at a temperature from 50° C. to 125° C., preferably less than 115° C. in the presence of a catalyst and a co-catalyst in an amount to produce between 10 and 200 ppm Al from the co-catalyst in the polymer as described herein.

The present invention further provides a polymer comprising from 0 to 20 weight % of one or more $C_{3-8}$ alpha-olefins, from 80 to 100 wt % of ethylene having a molecular weight (Mw) greater than 25,000 and a polydispersity ($M_w/M_n$) from 2.5 to 10, for a single reactor typically from 2.5 to 5 preferably from 3 to 4, prepared according to the above process.

The present invention provides a process for controlling the catalyst productivity above 2000 g of polymer per gram of catalyst under standard gas phase operations when manufacturing an ethylene hexene copolymer having a 1 MI and a density of 0.918 g/cc comprising recycling a gaseous mixture comprising from 0 to 60 mole % hydrogen, from 0 to 35 mole % of one or more $C_{3-8}$ alpha-olefins, from 15 to 100 mole % of ethylene and from 0 to 75 mole % of an inert gas through a particulate bed of growing polymer particles comprising polymer, a catalyst prepared by contacting at a temperature from 0° C. to 100° C. a support which has been heat treated to remove adsorbed water and having a residual surface hydroxyl content from 0.1 to 5 mmol/g of support, which support has been subsequently treated with an aluminum compound $(Al^1)$ of the formula $R^1{}_bAl(OR^1)_aX_{3-(a+b)}$ wherein a is either 0 or 1, b is either 2 or 3 and the sum of a+b is up to 3, $R^1$ is independently selected from the group consisting of $C_{1-10}$ alkyl radicals, and X is a chlorine atom, in an inert hydrocarbyl solvent or diluent with or without isolation of the treated support from the hydrocarbyl solvent or diluent to provide 0.5 to 2.5 wt % Al on the support: a transition metal compound of the formula $Ti(OR^2)_cX_d$ wherein $R^2$ is selected from the group consisting of a $C_{1-4}$ alkyl radical and a $C_{6-10}$ aromatic radical, X is selected from the group consisting of a chlorine atom and a bromine atom, c is 0 or an integer up to 4 and d is 0 or an integer up to 4 and the sum of c+d is the valence of the Ti atom; a magnesium compound, of formula $(R^5)_eMgX_{2-e}$ wherein each $R^5$ is independently a $C_{1-8}$ alkyl radical and e is 1 or 2 and X is a chlorine or bromine atom; a reactive organic halide selected from the group consisting of $CCl_4$, $C_{3-6}$ secondary and tertiary alkyl halides and mixtures thereof; a second aluminum alkyl compound independently having the formula $R^1{}_bAl(OR^1)_aX_{3-(a+b)}$ wherein a is either 0 or 1, b is either 2 or 3 and the sum of a+b is up to 3, $R^1$ is independently selected from the group consisting of $C_{1-10}$ alkyl radicals, and X is a chlorine atom and a ketone selected from the group consisting of $C_{3-18}$ linear or cyclic, aliphatic or aromatic ketones, to provide a molar ratio of total Al to Ti from 2:1 to 15:1; a molar ratio of Al from the second aluminum component $(Al^2)$: Ti from 1:1 to 8:1 a molar ratio of Mg:Ti from 1:1 to 20:1; a molar ratio of active halide from the alkyl halide to Mg from 1:1 to 6:1; a molar ratio of ketone to Mg from 0.5:1 to 5:1 and the titanium is present in the catalyst in an amount from 0.20 to 3.0 weight % inclusive of the support and separating the resulting catalyst from the inert hydrocarbyl solvent or diluent and a co-catalyst of the formula $R^1{}_bAl(OR^1)_aX_{3-(a+b)}$ wherein a is either 0 or 1, b is either 2 or 3 and the sum of a+b is up to 3, $R^1$ is independently selected from the group consisting of $C_{1-10}$ alkyl radicals, and X is a chlorine atom, at a pressure from 10 to 500 psi, and at a temperature from 50° C. to 125° C.

The catalyst may be manufactured according to U.S. application Ser. No. 10/977,949 filed Oct. 29, 2004.

In a particularly preferred embodiment the present invention provides a process for the gas phase polymerization of ethylene and one or more $C_{3-8}$ copolymerizable alpha olefin monomers in the presence of a supported Ziegler-Natta catalyst comprising one or more aluminum compounds of the formula $R^1{}_bAl(OR^1)_aX_{3-(a+b)}$ wherein a is either 0 or 1, b is either 2 or 3 and the sum of a+b is up to 3, $R^1$ is the same or different $C_{1-10}$ alkyl radical, X is a chlorine atom, a titanium compound of the formula $Ti(OR^2)_cX_d$ wherein $R^2$ is selected from the group consisting of a $C_{1-4}$ alkyl radical, a $C_{6-10}$ aromatic radical, X is selected from the group consisting of a chlorine atom and a bromine atom, c is 0 or an integer up to 4 and d is 0 or an integer up to 4 and the sum of c+d is the valence of the Ti atom; a magnesium compound of the formula $(R^5)_eMgX_{2-e}$ wherein each $R^5$ is independently selected from the group consisting of $C_{1-8}$ alkyl radicals, X is a chlorine atom and e is 1 or 2, a reactive organic halide selected from the group consisting of $CCl_4$, $C_{3-6}$ secondary and tertiary alkyl halides, preferably chlorides, or a mixture thereof and a ketone.

In accordance with some preferred aspects of the present invention there is provided component loading ratios of: a molar ratio of total aluminum $(Al^1+Al^2)$ to Ti from 2:1 to 15:1, preferably from 2.5:1 to 10:1, more preferably from 4:1 to 10:1; a molar ratio of Al from the second alkyl aluminum $(Al^2)$ to Ti from 1:1 to 8:1; a molar ratio of Mg:Ti from 1:1 to 20:1, preferably from 2:1 to 12:1, most preferred from 2.5:1 to 10:1; a molar ratio of active halide from the reactive organic halide to Mg from 1:1 to 6:1, preferably from 1.5:1 to 5:1; and a molar ratio of ketone to Ti from 0.5:1 to 18:1, preferably from 1:1 to 15:1; a molar ratio of ketone to Mg from 0.5:1 to 5:1 preferable from 0.5:1 to 4:1; said catalyst being co-catalyzed with a co-catalyst selected from the group consisting of aluminum compounds of the formula $R^1{}_bAl(OR^1)_aX_{3-(a+b)}$ wherein a is either 0 or 1, b is either 2 or 3 and the sum of a+b is up to 3, $R^1$ is the same or different $C_{1-10}$ alkyl radical, X is a chlorine atom, and mixtures thereof, preferably in an amount to provide from 10 to 200 ppm of aluminum from the co-catalyst based on the polymer production rate.

In accordance with a further aspect of the present invention there is provided a method for controlling a gas phase polymerization of a mixture comprising from 0 to 60 mole % hydrogen, from 0 to 35 mole % of one or more $C_{3-8}$ alpha-olefins, from 15 to 100 mole % of ethylene and from 0 to 75 mole % of an inert gas such as $N_2$, in the presence of the above noted supported Ziegler-Natta catalyst co-catalyzed with a co-catalyst selected from the group consisting of aluminum compounds of the formula $R^1{}_bAl(OR^1)_aX_{3-(a+b)}$ wherein a is either 0 or 1, b is either 2 or 3 and the sum of a+b is up to 3, $R^1$ is the same or different $C_{1-10}$ alkyl radical, X is a chlorine atom, and mixtures thereof by controlling the amount of co-catalyst in the range from 10 to 200 ppm aluminum based on the polymer production rate in the reactor and typically an Al:Ti molar ratio 25:1 to 80:1.

BEST MODE

In this specification the term MI means melt index. The MI is determined according to ASTM D 1238-04 at condition 190/2.16 (at 190° C. and under a weight of 2.16 kg).

In this specification density (g/cc or kg/m$^3$) means the density determined according to ASTM D 792-00.

In this specification the terms catalyst and catalyst precursor are used interchangeably as some may consider the catalyst the species activated with the co-catalyst. The term catalyst and catalyst precursor mean the composition which may be and preferably is supported, before further reaction with the activator, typically a tri $C_{1-8}$, preferably $C_{2-6}$, most preferably $C_{2-4}$ alkyl aluminum or $C_{1-8}$, preferably $C_{2-6}$ most preferably $C_{2-4}$ alkyl aluminum halide in the reactor. The catalyst or catalyst precursor may be pre polymerized prior to introduction into the reactor. Typically the pre polymer comprises from about 5 to 20, typically 5 to 15-weight % of supported catalyst.

A polymerization process is the gas phase process.

The gas phase, and particularly the fluidized bed gas phase polymerization of ethylene polymers has been known for some time. A broad general description of these types of processes is set out in the paper "Gas Phase Ethylene Polymerization: Production Processes, Polymer Properties, and Reactor Modeling", by Tuyu Xie, Kim B. McAuley, James C. C. Hsu, and David W. Bacon, Ind. Eng. Chem. Res. 1994, 33, 449-479.

Generally, a monomer feed comprising at least ethylene and optionally one or more $C_{3-8}$ alpha-olefins optionally together with hydrogen and/or an inert gas are fed to the fluidized bed. In a fluidized bed reactor, the velocity of the gas is sufficient to suspend the bed in the fluid (gas) flow of monomer and other components. In a stirred bed reactor mechanical agitation serves to help suspend the bed. Generally a fluid bed reactor is vertical and a stirred bed reactor is horizontal. Concurrently with the monomers a co-catalyst and a supported catalyst are fed to the bed. The monomer passing over the supported catalyst polymerizes on the catalyst and in the pores of the catalyst support causing the particle to increase in size and to break. The resulting polymer particle continues to grow as it resides in the reactor. In a stirred tank reactor the bed is stirred to a discharge section and leaves the reactor. In a fluidized bed the reactor typically has a lower narrower section to keep the fluid (gas) velocity sufficiently high to fluidize the bed. There is an expanded zone at the top of the reactor to reduce the speed of the gas passing through this part of the reactor so the polymer/catalyst particles fall back into the bed. The discharge is from the bed zone in the reactor.

In both the fluidized bed and stirred bed the polymer particles removed from the reactor are degassed to remove any volatile material, deactivated, and the resulting polymer (with entrained catalyst) may then be further treated (e.g. stabilizers added and pelletized if necessary).

In accordance with the present invention, Ziegler-Natta catalysts are used in the gas phase polymerization of ethylene. Typically, the catalysts comprise a support, a magnesium compound (optionally in the presence of a halide donor to precipitate magnesium halide), a titanium compound and an aluminum compound, in the presence of a ketone. The aluminum compound is added at different stages. First it is added to the support to chemically treat it (i.e. $Al^1$) and second it is added at some point during the manufacture of the catalyst (i.e. $Al^2$).

The support, if present, for the catalysts useful in the present invention typically comprises an inorganic substrate usually of alumina or silica having a pendant reactive moiety. The reactive moiety may be a siloxy radical or more typically is a hydroxyl radical. The preferred support is silica. The support should have an average particle size from about 0.1 to 150 microns, typically from 10 to 150 microns, preferably from about 20 to 100 microns. The support should have a large surface area typically greater than about 100 m²/g, preferably greater than about 250 m²/g, most preferably from 300 m²/g to 1,000 m²/g. The support may be porous and may have a pore volume from about 0.3 to 5.0 ml/g, typically from 0.5 to 3.0 ml/g. Supports, which are specifically designed to be an agglomeration of sub-particles while useful, are not required.

The support can be heat treated and/or chemically treated to reduce the level of surface hydroxyl (OH) groups in a similar fashion to that described by A. Noshay and F. J. Karol in *Transition Metal Catalyzed Polymerizations*, Ed. R. Quirk, 1989, pg. 396. After treatment the support may be put into a mixing vessel and slurried with an inert solvent or diluent preferably a hydrocarbon and contacted with or without isolation or separation from the solvent or diluent with the remaining catalyst components.

It is important that the support be dried prior to the initial reaction with an aluminum compound. Generally, the support may be heated at a temperature of at least 200° C. for up to 24 hours, typically at a temperature from 500° C. to 800° C. for about 2 to 20, preferably 4 to 10 hours. The resulting support will be free of adsorbed water and should have a surface hydroxyl content from about 0.1 to 5 mmol/g of support, preferably from 0.5 to 3 mmol/g.

A silica suitable for use in the present invention has a high surface area and is amorphous. For example, commercially available silicas are marketed under the trademark of Sylopol® 958 and 955 by Davison Catalysts a Division of W. R. Grace and Company and ES-70W or ES-757 by INEOS Silica.

The amount of the hydroxyl groups in silica may be determined according to the method disclosed by M. P. McDaniel, in J. of *Catalysis*, 67, 71-76, 1980, the entire contents of which are incorporated herein by reference.

While heating is the most preferred means of removing OH groups inherently present in many carriers, such as silica, the OH groups may also be removed by other removal means, such as chemical means. For example, a desired proportion of OH groups may be reacted with a suitable chemical agent, such as a hydroxyl reactive aluminum compound (e.g. triethyl aluminum) or a silane compound. This method of treatment has been disclosed in the literature and two relevant examples are: U.S. Pat. No. 4,719,193 to Levine in 1988 and by Noshay A. and Karol F. J. in *Transition Metal Catalyzed Polymerizations*, Ed. R. Quirk, 1989, pg. 396. For example the support may be treated with an aluminum compound of the formula $R^1{}_b Al(OR^1)_a X_{3-(a+b)}$ wherein a is either 0 or 1, b is either 2 or 3 and the sum of a+b is up to 3, $R^1$ is the same or different $C_{1-10}$ alkyl radical, X is a chlorine atom, and mixtures thereof. The amount of aluminum compound is such that the amount of aluminum on the support prior to adding the remaining catalyst components will be from about 0.5 to 2.5 weight %, preferably from 1.0 to 2.0 weight % based on the weight of the support. The remaining aluminum content is added as a subsequent or second component of the catalyst (e.g. $Al^2$). The first and second aluminum compounds may be the same or different.

Typically the Ziegler-Natta catalyst useful in accordance with the present invention will comprise a second aluminum compound ($Al^2$) of the formula $R^1{}_b Al(OR^1)_a X_{3-(a+b)}$ wherein a is either 0 or 1, b is either 2 or 3 and the sum of a+b is up to 3, $R^1$ is the same or different $C_{1-10}$ alkyl radical, X is a chlorine atom, and mixtures thereof, a titanium compound of the formula $Ti(OR^2)_c X_d$ wherein $R^2$ is selected from the group consisting of a $C_{1-4}$ alkyl radical, a $C_{6-10}$ aromatic radical, X is selected from the group consisting of a chlorine atom and a bromine atom, c is 0 or an integer up to 4 and d is 0 or an integer up to 4 and the sum of c+d is the valence of the Ti atom; a magnesium compound of the formula $(R^5)_e MgX_{2-e}$ wherein each $R^5$ is independently a $C_{1-8}$ alkyl radical and e is 1 or 2; a reactive organic halide selected from the group consisting of $CCl_4$ and $C_{1-6}$ alkyl halides preferably $C_{3-6}$ secondary and tertiary alkyl halides, preferably chlorides or a mixture thereof and a ketone, a molar ratio of total Al to Ti (e.g. the first and second aluminum additions $Al^1$ and $Al^2$—typically from 0 to 70 weight % of the aluminum compound is used to treat the support and the remaining aluminum is added at some time during the rest of the catalyst synthesis) from 2:1 to 15:1, preferably 2.5:1 to 10:1, most preferably 4:1 to 10:1, a molar ratio of Al from the second aluminum ($Al^2$) addition to Ti from 1:1 to 8:1; a molar ratio of Mg:Ti from 1:1 to 20:1, preferably 2:1 to 12:1; most preferably 2.5:1 to 10:1; a molar ratio of active halide (this excludes the halide from the Al and Ti compounds if present) from the $CCl_4$ or $C_{1-6}$ preferably $C_{3-6}$ alkyl halide or mixtures thereof to Mg from 1:1 to 6:1, preferably 1.5:1 to 5:1; and a molar ratio of ketones to Ti from 0.5:1 to 18:1, preferably from 1:1 to 15:1; a molar ratio of ketone to Mg from 0.5:1 to 5:1 preferable from 0.5:1 to 4:1.

Typically the catalyst components are reacted in an organic medium such as an inert $C_{5-10}$ hydrocarbon that may be unsubstituted or is substituted by a $C_{1-4}$ alkyl radical. Some solvents include pentane, isopentane, hexane, isohexane, heptane, octane, cyclohexane, methyl cyclohexane, hydrogenated naphtha and ISOPAR®E (a solvent available from Exxon Chemical Company) and mixtures thereof.

Typically the aluminum compounds (e.g. the first and/or second aluminum compounds) useful in the formation of the catalyst or catalyst precursor in accordance with the present invention have the formula $R^1_b Al(OR^1)_a X_{3-(a+b)}$ wherein a is either 0 or 1 preferably 0, b is either 2 or 3 preferably 3 and the sum of a+b is 2 or 3 preferably 3, $R^1$ is the same or different $C_{1-10}$, preferably a $C_{1-8}$ alkyl radical, X is a chlorine atom, and mixtures thereof. Suitable aluminum compounds include, trimethyl aluminum (TMA), triethyl aluminum (TEAL), diethyl aluminum ethoxide, diisobutyl aluminum ethoxide, isoprenyl aluminum, tri-isobutyl aluminum (TiBAL), diethyl aluminum chloride (DEAC), tri-n-hexyl aluminum (TnHAl), aluminum sesqui-halide, tri-n-octyl aluminum (TnOAl), and mixtures thereof. Preferably, in the aluminum compound a is 0, b is 3 and $R^1$ is a $C_{1-8}$ alkyl radical.

The magnesium compound may be a compound of the formula $(R^5)_e MgX_{2-e}$ wherein each $R^5$ is independently a $C_{1-8}$ alkyl radical and e is 1 or 2 preferably 2. Some commercially available magnesium compounds include methyl magnesium chloride, butyl octyl magnesium, dibutyl magnesium and butyl ethyl magnesium. The magnesium compound is used in conjunction with a $C_{3-6}$ halogenating agent or reactive organic halide to form magnesium halide (i.e. $MgX_2$ where X is a halogen preferably chlorine or bromine, most preferably chlorine), which precipitates from the solution (potentially forming a substrate for the Ti compound).

Some halogenating agents (e.g. reactive organic halides) include $CCl_4$ or one or more secondary or tertiary halides, preferably chlorides, of the formula $R^6 Cl$ wherein $R^6$ is selected from the group consisting of $C_{1-6}$ alkyl radicals preferably secondary and tertiary $C_{3-6}$ alkyl radicals. Suitable chlorides include sec-butyl chloride, t-butyl chloride and sec-propyl chloride. The reactive halide is added in a quantity such that the molar ratio of active halide (e.g. chloride from the reactive organic halide):Mg should be from 1:1 to 6:1, preferably from 1.5:1 to 5:1, more preferably from 1.9:1 to 5:1, and most preferably from 1.9 to 4:1.

The titanium compound in the catalyst has the formula $Ti(OR^2)_c X_d$ wherein $R^2$ is selected from the group consisting of a $C_{1-4}$ alkyl radical, and a $C_{6-10}$ aromatic radical, X is selected from the group consisting of a chlorine atom and a bromine atom preferably chlorine, c is 0 or an integer up to 4 and d is 0 or an integer up to 4 and the sum of c+d is the valence of the Ti atom. The titanium compound may be selected from the group consisting of $TiCl_3$, $TiCl_4$, $Ti(OC_4H_9)_4$, $Ti(OC_3H_7)_4$, and $Ti(OC_4H_9)Cl_3$. Most preferably the titanium compound is selected from the group consisting of $Ti(OC_4H_9)_4$ and $TiCl_4$ and mixtures thereof. Generally, the titanium in the catalyst or catalyst precursor is present in an amount from 0.20 to 3, preferably from 0.20 to 1.5, most preferably from 0.25 to 1.25 weight % based on the final weight of the catalyst (including the support).

A ketone is used in the catalysts or catalysts precursor used in accordance with the present invention. The ketone may be selected from the group consisting of $C_{3-18}$ linear or cyclic aliphatic or aromatic ketones. Most preferably, the ketone is selected from the group consisting of acetone, hexanone, cyclohexanone, butanone, acetaphenone, pentanone, methyl ethyl ketone, 3-methyl-2-butanone and methyl isobutyl ketone and mixtures thereof. The ketone may be used in a molar ratio to the titanium from 0.5:1 to 18:1 preferably in a molar ratio to Ti from 1:1 to 15:1, most preferably from 2:1 to 12:1.

In the catalyst or catalyst precursor the molar ratio of Mg:Ti may be from 1:1 to 20:1, preferably from 2:1 to 12:1, most preferably from 2.5:1 to 10:1; desirably 3.0:1 to 10:1. The molar ratio of second aluminum ($Al^2$) to titanium in the catalyst may be from 1:1 to 8:1, preferably from 1.5:1 to 7:1, most preferably from 1.5:1 to 6:1. Generally, from 0 to not more than about 70 weight %, preferably from 10 to 60 weight %, of the total aluminum (compound in the catalyst) may be used to treat the support (e.g. $Al^1$). The molar ratio of active halide (from the reactive organic halide) to Mg may be from 1:1 to 6:1, preferably 1.5:1 to 5:1, more preferably from 1.9:1 to 5:1, most preferably from 1.9:1 to 4:1. The molar ratio of ketone to Ti may be from 0.5:1 to 18:1, preferably from 1:1 to 15:1. most preferably from 2:1 to 12:1. The molar ratio of total Al:Mg in the catalyst or catalyst precursor may be from 0.35:1 to 3:1, preferably from 0.4:1 to 2:1.

In a preferred embodiment there is provided a process conducted in a hydrocarbon solvent at a temperature from 0° C. to 100° C. for preparing a catalyst in which the order of chemical addition is important and based on U.S. patent application Ser. No. 10/977,949, the entire text of which is hereby incorporated by reference, for the gas phase polymerization of alpha-olefins comprising:

a. contacting a dehydrated silica support, containing from 0.5 to 2.5 weight % aluminum having the formula $R^1_b Al(OR^1)_a X_{3-(a+b)}$ wherein a is either 0 or 1 preferably 0, b is either 2 or 3 preferably 3 and the sum of a+b is 2 or 3 preferably 3, $R^1$ is the same or different $C_{1-10}$, preferably a $C_{1-8}$ alkyl radical, X is a chlorine atom with;

b. a magnesium compound of the formula $Mg(R^5)_2$ wherein each $R^5$ is independently selected from the group consisting of $C_{1-8}$ alkyl radicals and may contain an aluminum alkyl as a thinning agent, to provide from 0.5 to 2.0 weight % of Mg based on the weight of the silica, contacting the resulting product with;

c. a reactive organic halide selected from the group consisting of $CCl_4$ and $C_{3-6}$ secondary and tertiary alkyl chlorides or a mixture thereof to provide a Cl:Mg molar ratio from 1.5:1 to 5:1 in the resulting product; and contacting the resulting product with;

d. an aluminum compound of the formula $R^1_b Al(OR^1)_a X_{3-(a+b)}$ wherein a is either 0 or 1 preferably 0, b is either 2 or 3 preferably 3 and the sum of a+b is 2 or 3 preferably 3, $R^1$ is the same or different $C_{1-10}$, preferably a $C_{1-8}$ alkyl radical, X is a chlorine atom; to provide a molar ratio of Al [from the second aluminum addition (e.g. $Al^2$)]:Ti from 1.5:1 to 7.0:1;

e. a ketone, which may be selected from the group consisting of $C_{3-18}$ linear or cyclic aliphatic or aromatic ketones. Most preferably, the ketone is selected from the group consisting of acetone, hexanone, cyclohexanone, butanone, acetaphenone, pentanone, methyl ethyl ketone, 3-methyl-2-butanone and methyl isobutyl ketone and mixtures thereof. The ketone may be used in a molar ratio to the titanium from 1:1 to 15:1, more preferably from 2:1 to 12:1;

f. a titanium compound of the formula $Ti(OR^2)_c X_d$ wherein $R^2$ is selected from the group consisting of a $C_{1-4}$ alkyl radical, and a $C_{6-10}$ aromatic radical, X is selected from the group consisting of a chlorine atom and a bromine atom, preferably a chlorine atom, c is 0 or an integer up to 4 and d is 0 or an integer up to 4 and the sum of c+d is the valence of the Ti atom, preferably 3 or 4, to provide from 0.20 to 1.5 weight % of Ti based on the final catalyst.

The productivity criteria is that the catalyst has a productivity of greater than 2000 grams of polymer per gram of catalyst (g/g) under standard commercial plant operations to produce an ethylene hexene copolymer having an MI of 1 and a density of 0.918 g/cc. The conditions of operation of a plant to produce a resin having a melt index (MI) of 1 as determined by ASTM D 1238-04 and a density of 0.918 g/cc as determined by ASTM D 792-00 are well known to those skilled in the art. However, if the productivity of a catalyst is below 2000 g of polymer/g of catalyst due to the poor selection of components, synthesis order and or loading levels then following the above criterion (including U.S. patent application Ser. No. 10/977,949), one of ordinary skill in the art, may, by routine non-inventive experimentation, determine appropriate components, loadings and sequence following the teachings of the present invention.

One needs to consider that the ideal catalyst of choice may be selected by the user to provide the best product for the lowest cost. However, in general there are three distinct user groups: polyethylene manufacturers, polyethylene converters and polyethylene consumers, and their criteria for success may not always be aligned. For example it is likely that everyone wants the best product for the least cost. However, the manufacturer may want to maximize plant throughput by increasing the flowability of the granular resin through the plant or by increasing the MWD to increase throughput through an extruder. Manufacturers may also choose to increase bulk density to increase the speed at which product can be discharged from the reactor. Alternately, manufacturers may want to reduce the need for a costly co-catalyst such as trimethyl aluminum and instead use triethyl aluminum. To limit capital costs, losses to flare or reduce the amount of co-monomer being recycled, manufacturers may also want a catalyst that requires low levels of co-monomer to ethylene in the reactor. Then again, manufacturers may want a catalyst with high productivity to reduce the amount they spend on catalyst. Converters will want to maximize throughput in their extruders and want broad MWD products without the loss of polymer physical properties. Hexane extractables may be important to a converter such that the products they make pass specific FDA regulations. Consumers on the other hand will want tough products in applications such as garbage bags and therefore may require high dart impact strength and machine direction (MD) tear strength. On the other hand, others may prefer sticky resin for stretch wrapping products. In summary, the ideal catalyst is dependant on the end user group and thus there can be many preferred catalysts. From a manufacturers perspective it would be best to have one catalyst fit all. However, from a users perspective one generally prefers to have specific areas addressed. As an example, for any given product, while one manufacturer wants a high productivity catalyst, another may want a catalyst that delivers a product with low hexane extractables, or high bulk density while a third may want a low $C_6/C_2$ gas phase ratio.

One general synthetic procedure which follows the above criteria could be written as follows: treated silica (i.e. heat treated then treated with TEAL) is added to a reaction vessel and treated consecutively with the following, with or without isolation (separation of the product from the solvent or dispersant), dialkyl magnesium compound such as dibutyl magnesium or butyl ethyl magnesium, alkyl chloride such as t-butyl chloride or s-butyl chloride, a ketone such as acetone or cyclohexanone, a titanium compound such as titanium tetrachloride or titanium butoxide, and a second aluminum alkyl such as triethyl aluminum or trioctyl aluminum prior to drying to produce a free flowing powder. This is one of the acceptable orders as defined above.

The catalyst or catalyst precursor is fed to the reactor, generally above a distributor plate into the bed of growing polymer particles using a metering device. One such device is disclosed at Col. 8 lines 15-20 of U.S. Pat. No. 4,543,399 issued Sep. 24, 1985 to Jenkins III et al. assigned to Union Carbide Corporation (which references U.S. Pat. No. 3,779,712 issued Dec. 18, 1973 to Calvert et al., assigned to Union Carbide Corporation). The co-catalyst, typically a tri $C_{1-8}$ alkyl aluminum (in neat form or in a solution diluted with a hydrocarbon solvent) is also fed to the bed of growing polymer particles using a liquid metering device. Such devices are known in the art.

The co-catalyst may be selected from the group consisting of tri $C_{1-8}$ alkyl or alkenyl; aluminums, alkyl aluminum alkoxides, alkyl aluminum chlorides (e.g. di $C_{1-8}$ alkyl aluminum chloride), and mixtures thereof. This includes trimethyl aluminum, triethyl aluminum, tripropyl aluminum, tributyl aluminum, triisobutyl aluminum, diethyl aluminum ethoxide, diisobutyl aluminum ethoxide, isoprenylaluminum, tri-n-hexyl aluminum, tri-octyl aluminum, diethyl aluminum chloride, dibutyl aluminum chloride, and mixtures thereof. A preferred co-catalyst is triethyl aluminum. While the aluminum halides might be useful in accordance with the present invention they increase the amount of halide in the polymer resulting in increased consumption of additives to neutralize and stabilize the resulting polymer and are therefore not preferred.

The co-catalyst may be fed to the reactor to provide preferably, 10 to 200, more preferably 12 to 100 most preferably from 15 to 75, desirably from 20 to 50 ppm of aluminum (Al ppm) based on the polymer production rate. Such a process is more fully described in U.S. Pat. No. 6,825,293 issued to NOVA Chemicals on Nov. 30, 2004 (the text of which is hereby incorporated by reference).

In the reactor the gas phase typically comprises the monomers, a balance gas such as nitrogen, a molecular weight control agent such as hydrogen, and depending on the process possibly a condensable liquid (i.e. condensing mode such as disclosed in U.S. Pat. No. 4,543,399 issued Sep. 24, 1985 to Jenkins III et al.; U.S. Pat. No. 4,588,790 issued May 15, 1986 to Jenkins III et al.; and the so-called super condensing mode as disclosed in U.S. Pat. No. 5,352,749 issued Oct. 4, 1994 to DeChellis et al., assigned to Exxon Chemical Patents, Inc. and U.S. Pat. No. 5,436,304 issued Jul. 25, 1995 to Griffen et al., assigned to Exxon Chemical Patents, Inc.).

The reactor mixture may comprise from 0 to 60 mole % hydrogen, from 0 to 35 mole % of one or more $C_{3-8}$ alpha-olefins, from 15 to 100 mole % of ethylene and from 0 to 75 mole % of an inert gas such as $N_2$. Copolymerizable olefins include butene (1-butene), 4-methyl-1-pentene, pentene, hexene (1-hexene) and octene (1-octene), although it may be difficult to keep significant amounts of octene in the gas phase. The polymer may have a density from 0.905 to 0.965 g/cc, typically from about 0.910 to about 0.960 g/cc.

Triethyl aluminum may be used as a co-catalyst in amounts from 10 to 200 ppm Al based on the polymer production rate, more preferably 12 to 100 most preferably from 15 to 75, desirably from 20 to 50 ppm of aluminum.

Fluidized bed gas phase reactors to make polyethylene are generally operated at temperatures from about 50° C. up to about 125° C. (provided the sticking temperature of the polymer is not exceeded) preferably from about 75° C. to about 110° C. and at pressures typically not exceeding 3,447 kPa (about 500 psi) preferably not greater than about 2,414 kPa (about 350 psi).

Typically the resulting polymer will comprise from 85 to 100 weight % of ethylene and from 0 to 15 weight % of one or more $C_{3-8}$ alpha-olefins. The polymer should have a molecular weight (weight average, Mw) greater than 25,000. The polymers prepared according to the present invention will have a polydispersity (Mw/Mn) from 2.5 to 5, preferably from 3 to 4.

The resulting polymers may be used in a number of applications such as film extrusion, both cast and blown film extrusion and both injection and rotomolding applications. Typically the polymer may be compounded with the usual additives including heat and light stabilizers such as hindered phenols; ultra violet light stabilizers such as hindered amine light stabilizers (HALS); process aids such as fatty acids or their derivatives and fluoropolymers optionally in conjunction with low molecular weight esters of polyethylene glycol.

The present invention will now be illustrated by the following non-limiting examples.

Synthesis Examples 1 to 19

Essentially, silica (42 g), which had been dehydrated substantially as described in U.S. Pat. No. 6,140,264, was added to a 500 mL stainless steel reactor in a glove box. To the flask was added approximately 150 mL of pentane, which was subsequently heated to 50° C. After the pentane was added the slurry was stirred and triethyl aluminum (0.024 mole) was added over approximately 5 minutes. After stirring for 30 minutes, the sample was dried. The remaining reactions were carried out at approximately 20 to 25° C. After reslurrying the treated silica, dibutyl magnesium (53 mmol) was added over approximately 15 minutes followed by triethyl aluminum (~6.5 mmol, used to simulate TEAL as a thinning agent in magnesium alkyl compounds, which is used commercially). After stirring for 2 hours, the slurry was dried. Solvent was again added to the reactor and cooled to maintain a temperature below 20° C. while t-butyl chloride (106 mmol) was added as a dilute (~25 wt %) solution over about 15 minutes. After stirring for 2 hours the slurry was dried. Pentane was again added to the reactor at which time titanium tetrachloride (6.6 mmol) was added as a dilute solution (~20%) over approximately 5 minutes. After 2 hours of stirring the catalyst was dried. Next, pentane was added to the reactor and after remixing the slurry, an electron donor (40 mmol. see Table 1) was added as a dilute solution over about 10 minutes. After 1 hour of stirring the slurry was dried. Pentane was added to the reactor and trihexyl aluminum (20 mmol) was added over approximately 10 minutes. After stirring for 45 minutes the slurry was dried under vacuum at 50° C. to produce approximately 63 g of tan powder. Alternately, the entire synthesis can be completed at essentially room temperature using only a single drying step at the end.

Bench Scale Polymerization Method for Catalysts

Each of the above catalysts (60 mg) were tested in a 2 L stirred bed catalytic reactor at 85° C. containing hydrogen (25 psi), nitrogen (60 psi), ethylene (120 psi), and a hexene:$C_2H_4$ molar ratio of 0.065. Triethyl aluminum was used as a co-catalyst and an Al:Ti ratio of 60:1 was used for all experiments. The polymerization was continued for 1 hour at which time the feed gases were stopped and the reactor was vented. The MI of the resulting polymer formed under these conditions is reported in FIG. 1 and Table 1.

TABLE 1

BSR Evaluation of the Effect of Electron Donors on LLDPE MI

| Example | CHEMICAL NAME | Group | Formula | MI | MI | Average MI |
|---|---|---|---|---|---|---|
| 1 | Trimethyl phoshpine | phosphine |  | 0.71 | 0.81 | 0.76 |
| 2 | Triphenyl phosphine | phosphine |  | 0.89 | 0.96 | 0.93 |
| 3 | Acetone | ketone |  | 1.44 | 1.34 | 1.39 |
| 4 | Acetophenone, 99% | ketone |  | 1.14 | 1.18 | 1.16 |
| 5 | Cyclohexanone | ketone |  | 1.42 | 1.36 | 1.39 |

TABLE 1-continued

BSR Evaluation of the Effect of Electron Donors on LLDPE MI

| Example | CHEMICAL NAME | Group | Formula | MI | MI | Average MI |
|---|---|---|---|---|---|---|
| 6 | 1-Indanone | ketone |  | 1.50 | 1.44 | 1.47 |
| 7 | 2,4-pentadione | ketone |  | 1.16 | 1.08 | 1.12 |
| 8 | butyl ether | ether |  | 0.59 | 0.65 | 0.62 |
| 9 | Diethyl ether | ether |  | 0.47 | 0.48 | 0.48 |
| 10 | 1,4-Dioxane (99+%) | ether |  | 0.89 | nd | 0.89 |
| 11 | Tetrahydrafuran | ether |  | 0.52 | 0.52 | 0.52 |
| 12 | 2,6-Dimethylanisole | ether |  | 0.64 | 0.62 | 0.63 |
| 13 | Caprolactone | ester |  | 0.68 | 0.72 | 0.70 |
| 14 | ethyl acetate | ester |  | 1.06 | 0.77 | 0.91 |
| 15 | Ethyl benzoate | ester |  | 0.83 | 0.61 | 0.72 |
| 16 | N,N-Dimethylaniline | amine |  | 0.93 | 0.77 | 0.85 |
| 17 | Triethylamine | amine | Et3N | 0.37 | 0.44 | 0.41 |
| 18 | Benzaldehyde | aldehyde |  | 1.05 | 1.04 | 1.05 |

TABLE 1-continued

BSR Evaluation of the Effect of Electron Donors on LLDPE MI

| Example | CHEMICAL NAME | Group | Formula | MI | MI | Average MI |
|---|---|---|---|---|---|---|
| 19 | butyraldehyde | aldehyde |  | 1.46 | 1.30 | 1.38 |

Observations

Figure 1:
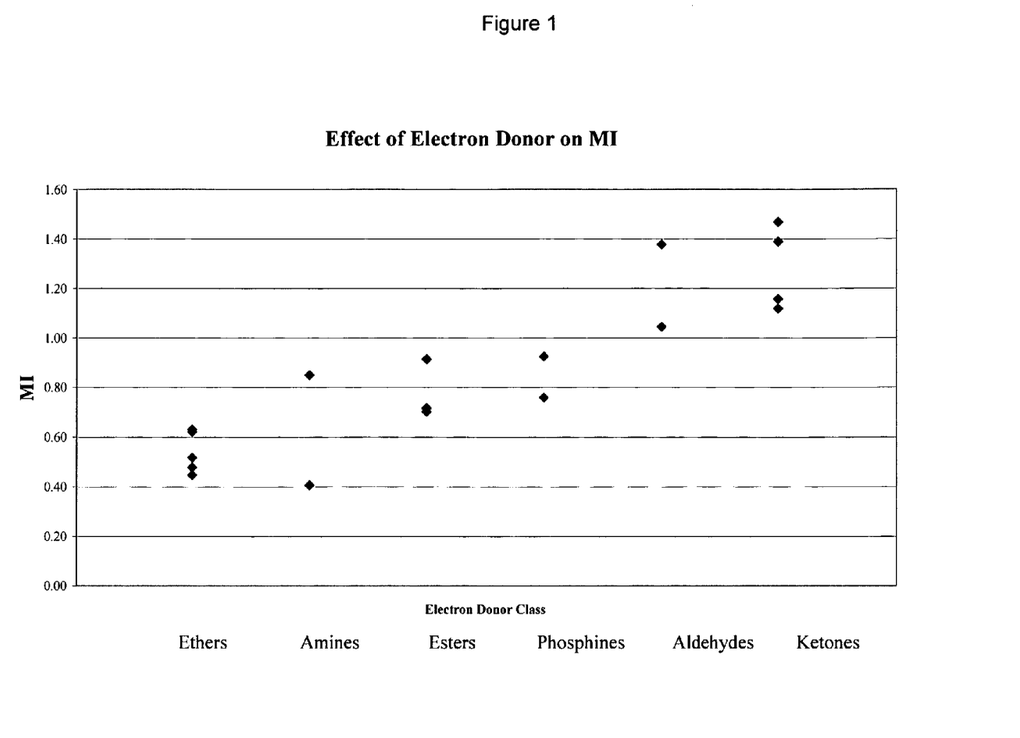
FIG. 1 is a graph of the effect of electron donors on MI.

From the data shown in FIG. 1 and Table 1 it is apparent that catalysts containing ketones generate polyethylene having the highest MI when compared to the other electron donors used in this study. It is also apparent that the electron donor family has an affect on the polymers MI. While data is not provided, other findings when changing electron donors are that they affect productivity, density, MFR, hexane extractables and comonomer incorporation. In most cases, the electron donors containing aromatic substituents have lower productivity compared to their aliphatic counter part.

What is claimed is:

1. A process for preparing an alpha-olefin polymerization catalyst composition having a productivity of greater than 2000 g of a polymer per gram of catalyst under standard gas phase operations used to manufacture a 1 MI ethylene hexene copolymer resin having a density of 0.918 g/cc, comprising contacting at a temperature from 0° C. to 100° C. a support selected from the group consisting of silica and alumina and mixtures thereof having an average particle size from about 10 to 150 microns, a surface area greater than 100 m²/g and a pore volume from about 0.3 to 5.0 ml/g, which has been heat treated to remove adsorbed water and having a residual surface hydroxyl content from 0.1 to 5 mmol/g of support, which support has been subsequently treated with an aluminum compound (Al$^1$) of the formula R$^1_b$Al(OR$^1$)$_a$X$_{3-(a+b)}$ wherein a is either 0 or 1, b is either 2 or 3 and the sum of a+b is 3 and R$^1$ is independently selected from the group consisting of C$_{1-10}$ alkyl radicals and X is chlorine atom, reactive with the residual surface hydroxyl groups to provide from 0.5 to 2.5 wt % Al on the support, in an inert hydrocarbyl solvent or diluent with or without isolation of the treated support from the hydrocarbyl solvent or diluents; a transition metal compound of the formula the formula Ti(OR$^2$)$_c$X$_d$ wherein R$^2$ is selected from the group consisting of a C$_{1-4}$ alkyl radical and a C$_{6-10}$ aromatic radical, X is selected from the group consisting of chlorine atom and bromine atom, c is 0 or an integer up to 4 and d is 0 or an integer up to 4 and the sum of c+d is the valence of the Ti atom; a magnesium halide prepared by reacting in situ an alkyl magnesium compound of the formula (R$^5$)$_e$MgX$_{2-e}$ wherein each R$^5$ is independently a C$_{1-8}$ alkyl radical and e is 1 or 2 and X is chlorine or bromine atom with a reactive organic halide selected from the group consisting of CCl$_4$ and C$_{1-6}$ alkyl halides and mixtures thereof; a second aluminum alkyl compound (Al$^2$) of the formula R$^1_b$Al(OR$^1$)$_a$X$_{3-(a+b)}$ wherein a is either 0 or 1, b is either 2 or 3 and the sum of a+b is up to 3, and R$^1$ is independently selected from the group consisting of C$_{1-10}$ alkyl radicals and X is chlorine atom; and a ketone selected from the group consisting of hexanone, cyclohexanone, butanone, acetaphenone, pentanone, methyl ethyl ketone, 3-methyl-2-butanone and methyl isobutyl ketone and mixtures thereof to provide a molar ratio of electron donor to Mg from 0.5:1 to 5:1; a molar ratio of total Al(Al$^1$+Al$^2$) to Ti from 2:1 to 10:1; a molar ratio of Al from the second aluminum component (Al$^2$):Ti from 1:1 to 8:1; a molar ratio of Mg:Ti from 2.5:1 to 10:1; a molar ratio of active halide from the alkyl halide to Mg from 1:1 to 6:1; and the titanium is present in the catalyst in an amount from 0.20 to 3.0 weight % inclusive of the support and separating the resulting catalyst from the inert hydrocarbyl solvent or diluent.

2. The process according to claim 1, wherein in the catalyst the titanium component is selected from the group consisting of TiCl$_4$, Ti(OC$_4$H$_9$)$_4$, Ti(OC$_3$H$_7$)$_4$ and mixtures thereof.

3. The process according to claim 2, wherein in the catalyst the aluminum compound is selected from the group consisting of trimethyl aluminum, triethyl aluminum, diethyl aluminum ethoxide, diisobutyl aluminum ethoxide, tri iso-butyl aluminum, isoprenyl aluminum, tri-n-hexyl aluminum, tri-n-octyl aluminum, diethyl aluminum chloride and mixtures thereof.

4. The process according to claim 3, wherein in the catalyst the magnesium compound is selected from the group consisting of dibutyl magnesium, butyl octyl magnesium and butyl ethyl magnesium, the reactive alkyl halide is present in an amount to provide a molar ratio of active halogen:Mg from 1.5:1 to 5:1.

5. The process according to claim 4, wherein in the catalyst the reactive alkyl halide is a C$_{3-6}$ secondary or tertiary alkyl chloride.

6. The process according to claim 5 wherein the ketone is present in an amount to provide a molar ratio of ketone to Mg from 0.5:1 to 4:1.

7. The process according to claim 6, wherein the titanium compound is selected from the group consisting of Ti(OC$_4$H$_9$)$_4$ and TiCl$_4$ and mixtures thereof.

8. The process according to claim 7, wherein in the catalyst the Ti is present in an amount from 0.20 to 1.5 weight % inclusive of the support.

9. A process according to claim 1, wherein the catalyst is prepolymerized to provide from 5 to 20 weight % of catalyst in the prepolymer.

10. A gas phase process for the polymerization, at a pressure from 10 to 500 psi, of a mixture comprising from 0 to 60 mole % hydrogen, from 0 to 35 mole % of one or more C$_{3-6}$ alpha-olefins, from 15 to 100 mole % of ethylene and from 0 to 75 mole % of an inert gas such as N$_2$, conducted at a temperature from 50° C. to 125° C. in the presence of a catalyst according to claim 1.

11. The process according to claim 10, wherein the catalyst is activated with one or more co-catalyst of the formula R$^1_b$Al(OR$^1$)$_a$X$_{3-(a+b)}$ wherein a is either 0 or 1, b is either 2 or 3 and the sum of a+b is up to 3, R$^1$ is independently selected from the group consisting of C$_{1-10}$ alkyl radicals, and X is chlorine atom.

12. The process according to claim 11, wherein the co-catalyst is selected from the group consisting of trimethyl aluminum, triethyl aluminum, tripropyl aluminum, tributyl aluminum, triisobutyl aluminum, diethyl aluminum ethoxide, diisobutyl aluminum ethoxide, isoprenylaluminum, tri-n- hexyl aluminum, tri-octyl aluminum, diethyl aluminum chloride, dibutyl aluminum chloride, and mixtures thereof.

13. The process according to claim 12 wherein the co-catalysts is used in an amount to provide from 10 to 200 ppm of aluminum from the co-catalyst based on the polymer production rate.

14. The process according to claim 13 wherein the co-catalysts is used in an amount to provide from 15 to 75 ppm of aluminum from the co-catalyst based on the polymer production rate.

15. The process according to claim 14 wherein the co-catalyst is triethyl aluminum.

16. A slurry phase process for the polymerization, at a pressure from 10 to 500 psi, of a mixture comprising form 0 to 60 mole % hydrogen, from 0 to 35 mole % of one or more $C_{3-8}$ alpha olefins, from 15 to 100 mole % of ethylene and form 0 to 75 mole % of an inert gas, in an inert diluent conducted at a temperature from 50° C. to 125° in the presence of a catalyst according to claim 1.

* * * * *